United States Patent [19]

Geary et al.

[11] Patent Number: 4,696,569

[45] Date of Patent: Sep. 29, 1987

[54] METHOD OF MEASURING SPHERICAL ABERRATION AND APPARATUS THEREFOR

[75] Inventors: Joseph M. Geary, Edgewood; Phillip R. Peterson, Albuquerque, both of N. Mex.

[73] Assignee: The United States of America as represented by the Secretary of the Air Force, Washington, D.C.

[21] Appl. No.: 721,968

[22] Filed: Apr. 11, 1985

[51] Int. Cl.$^4$ ................................................ G01B 9/00
[52] U.S. Cl. ..................................... 356/124; 356/125
[58] Field of Search ................. 356/124, 125, 126, 127

[56] References Cited

U.S. PATENT DOCUMENTS

| | | | |
|---|---|---|---|
| 3,436,154 | 4/1969 | Baker et al. | 356/124 |
| 3,518,004 | 6/1970 | Brewer | 356/124 |
| 4,090,790 | 5/1978 | Dragon et al. | 356/125 |
| 4,099,877 | 7/1978 | Brouwer | 356/124 |
| 4,282,548 | 8/1981 | Plummer | 356/125 X |
| 4,386,849 | 6/1983 | Haeusler et al. | 356/124 |
| 4,402,602 | 9/1983 | Kuppenheimer, Jr. | 356/124 |

OTHER PUBLICATIONS

Jenkins et al., "Fundamentals of Optics", 3rd ed. McGraw-Hill, pp. 132–137, 1957.
"Optical Shop Testing," published by Wiley and Sons, 1978, pp. 71, 112, 113 and 241.

Primary Examiner—Eugene R. LaRoche
Assistant Examiner—James C. Lee
Attorney, Agent, or Firm—William G. Auton; Donald J. Singer; Jacob N. Erlich

[57] ABSTRACT

An optical testing method and apparatus employing a non-interferometric technique, making use of axial intensity information, in which the intensity of the light pattern along the optical axis is calibrated to achieve improved measurement of spherical aberration.

4 Claims, 26 Drawing Figures

METHOD OF MEASURING SPHERICAL ABERRATION AND APPARATUS THEREFOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to measurement of spherical aberration, and more particularly, to a method of employing a non-interferometric technique, making use of axial intensity information, in which the intensity of the light pattern along the optical axis is calibrated to achieve improved measurement of spherical aberration, and an apparatus for practice of same.

Spherical aberration is measurable via a number of experimental procedures. Qualitative and semi-qualitative estimates can be obtained by the visual inspection of the star image, or from a Foucault knife edge test. Quantitative methods include the Hartmann test, and a host of interferometric approaches, such as point diffraction, and lateral shear interferometry. However, such methods are known to be inaccurate, difficult to apply, and time-consuming in various applications.

It is therefore an object of the present invention to provide a novel method for accurate direct measurement of spherical aberrations in test pieces.

It is another object of the present invention to provide a novel apparatus for practice of the invention.

SUMMARY OF THE INVENTION

The present invention comprises a method and apparatus for measurement of spherical aberration as related to axial intensity profiles near focus for a lens under test. The method comprises determining the paraxial focus, determining actual focus, and measuring the difference therebetween.

For the purpose of the present invention, the following terms are defined as presented below: optical center, optical axis, paraxial rays, paraxial focus, paraxial plane, and actual focus.

The optical center of a lens is a point through which all rays of light pass, when going through the lens. The optical axis of a lens is an imaginary line which is perpendicular to the lens, and which passes through the optical center of the lens.

Paraxial rays are rays of light which are near the optical axis of the lens such that the sines of the angles between the paraxial rays and the optical axis may be replaced by the value of the angles themselves in calculations. The paths of paraxial rays are nearly parallel with the optical axis. The paraxial focus refers to the point where paraxial rays either come to a focus or come closest to converging along the optical axis. The paraxial plane is the focal plane located at the paraxial focus. The actual focus of a lens refers to the point where rays of light leaving the lens actually come to a focus. Where there exists no spherical aberration, the actual focus and paraxial focus are identical.

In an apparatus in practice of the invention, a source of collimated light is projected through a lens under test, and the far field pattern is then directed from a microscope to an aperture card. The lens is adjustable longitudinally by means of a micrometer mount, and it is adjusted to place the far field pattern, via the microscope, concentric to an aperture of the aperture card. The passed beam, via a diffuser, impinges upon a detector (such as a photo-multiplier tube), the output of which is evaluated, such as by a radiometer, the resultant irradiance signal being directable to a first channel of a chart recorder. This recorder is couplable at a second channel thereof to the micrometer, by means of which the x-y irradiance characteristics of the lens under test may be point-plotted. This point plot indicates the actual characteristics of the lens, which are comparable with the paraxial focus to determine spherical aberration thereof.

BRIEF DESCRIPTION OF THE DRAWINGS

The invention will be more clearly understood by reference to the following detailed description of a preferred embodiment thereof in conjunction with the accompanying drawings, in which:

FIGS. 1(a–o) comprises computer generated axial point intensity profiles for different amounts of spherical aberration;

FIGS. 3(a–g) comprises experimentally determined axial intensity profiles for different amounts of spherical aberration;

DETAILED DESCRIPTION OF THE DRAWINGS

It is known that if the Fresnel-Kirchhoff diffraction integral is evaluated for a perfect lens, the intensity profile is $$I_\delta(0) = I_\theta \sin c^2(\delta) \tag{1}$$

where $\delta$ is the displacement from paraxial focus. Note that $I_\delta(0)$ is symmetric about $\delta = 0$. See Appendix 1 for a discussion of symmetry of axial intensity. As spherical aberration is introduced, the axial intensity pattern shifts away from paraxial focus, and becomes less sin $c^2$ looking. However, it nonetheless remains symmetric about an axial point defined by $$W_{\theta 2\theta} = -W_{\theta 4\theta} \tag{2}$$

where $W_{\theta 2\theta}$ = defocus, and $W_{\theta 4\theta}$ = spherical aberration (as defined in the exit pupil by departure in the wavefront from a reference sphere). Note that equation (2) is a condition which minimizes the rms wavefront. It is generally valid for $W_{\theta 4\theta} < 1\lambda$. The maintenance of symmetry in this region can be seen from an examination of the expression for the Strehl ratio $$I_\delta(0) = 1 - k\{<w^2> - <w>^2\} \tag{3}$$

where $$W = W_{\theta 2\theta} r^2 + W_{\theta 4\theta} r^4 \tag{4}$$

$$<w> = 2 \int_0^1 W r\, dr \tag{5}$$

$$\langle w_2 \rangle = 2 \int_0^1 W^2 \, rdr \tag{6}$$

$$\delta = 8(F/\#)^2 W_{\theta 2\theta} \tag{7}$$

Substitution of Equations 4–6 into equation (3) results in $$I_\delta(0) = 1 - k^2 \left( \frac{1}{12} W_{020}^2 + \frac{4}{45} W_{040}^2 + \frac{1}{6} W_{020} W_{040} \right) \tag{8}$$

Completing the square, equation 8 can be rewritten as . . .

$$I_\delta(0) = 1 - k^2 \left( \frac{1}{12} (W_{020} + W_{040})^2 + \frac{1}{180} W_{040}^2 \right) \tag{9}$$

Let . . .

$$W_{020} = -W_{040} \pm \xi, \tag{10}$$

and Equation 9 becomes . . .

$$I_\delta(0) = 1 - k^2 \left( \frac{\xi^2}{12} + \frac{W_{\theta 4\theta}^2}{180} \right) \tag{11}$$

Equation 11 shows that $I_\delta(0)$ is symmetric about $W_{020} = -W_{040}$. This turns out to be true in general, even when Equation 2 is no longer valid. The proof is shown in Appendix 2.

The Fresnel-Kirchhoff diffraction integral was modeled to obtain axial intensity profiles in the presence of varying amounts of spherical aberration. The latter was generated by considering a plano-convex lens (plano side facing collimated input beam) whose pupil size controlled the amount of spherical aberration. This is found from . . .

$$W_{040} = \frac{1}{32} \phi^3 y^4 \sigma_1 \tag{12}$$

where
$\phi = 0.020383$
$\Sigma_1 = 40.54$
y = pupil radius

Figure 1:
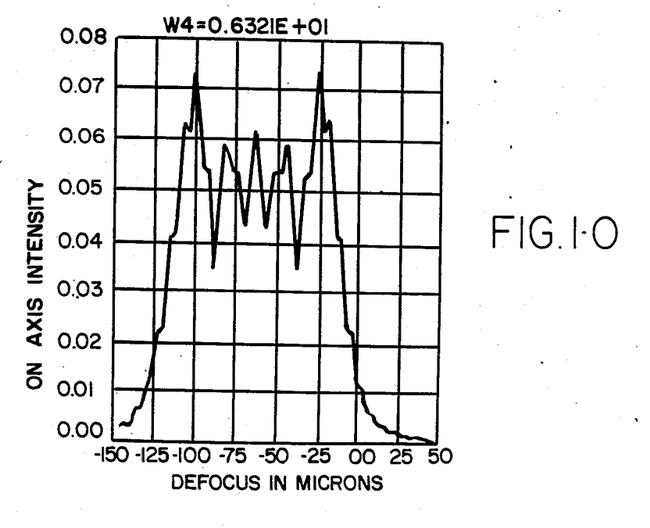
Figures 1A, 1B, 1C:
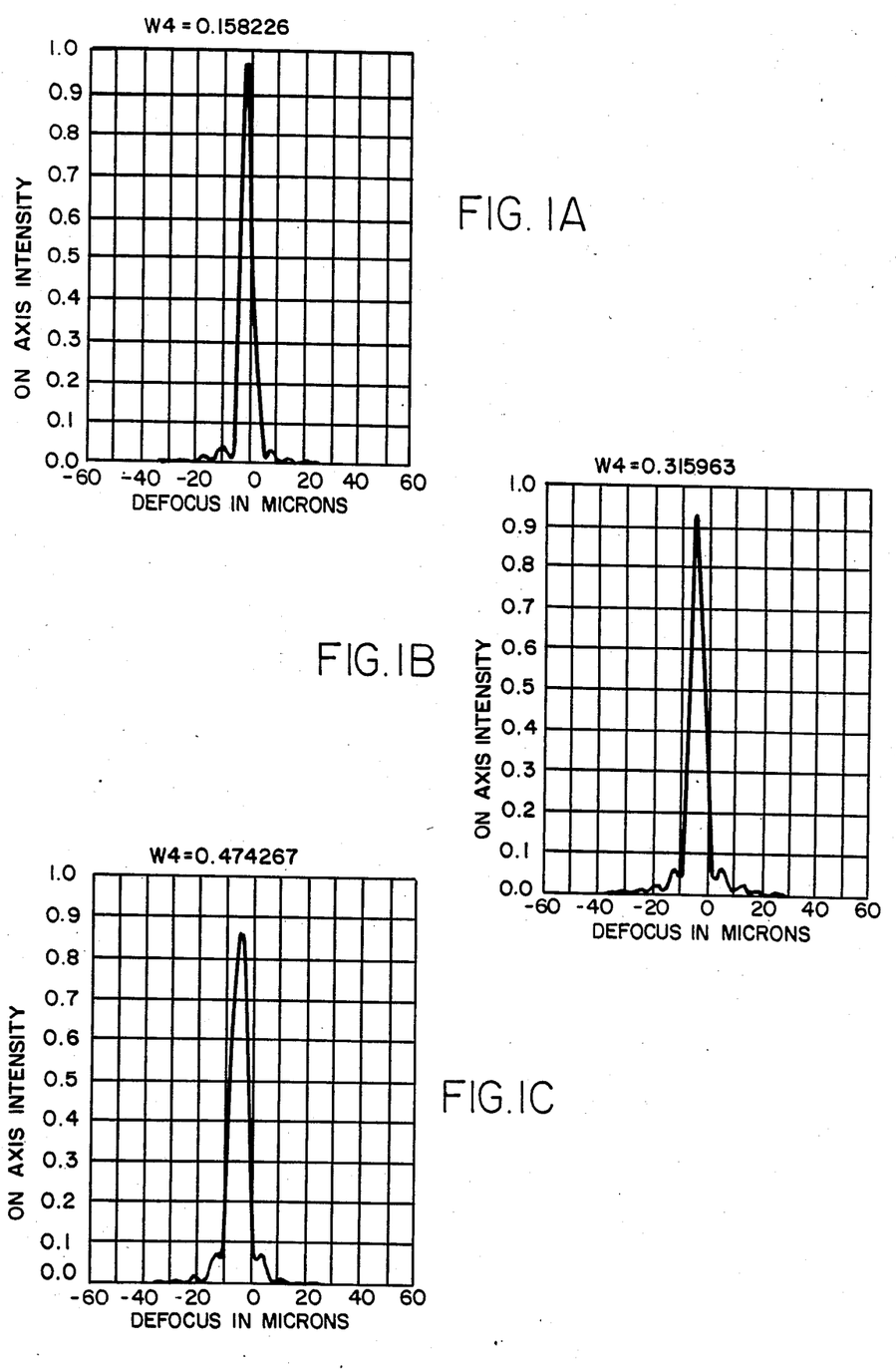
Figure 1D:
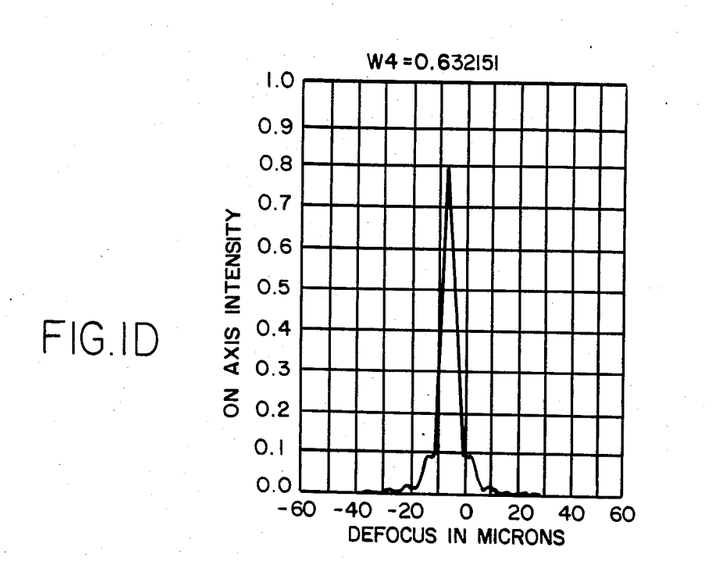
Figure 1E:
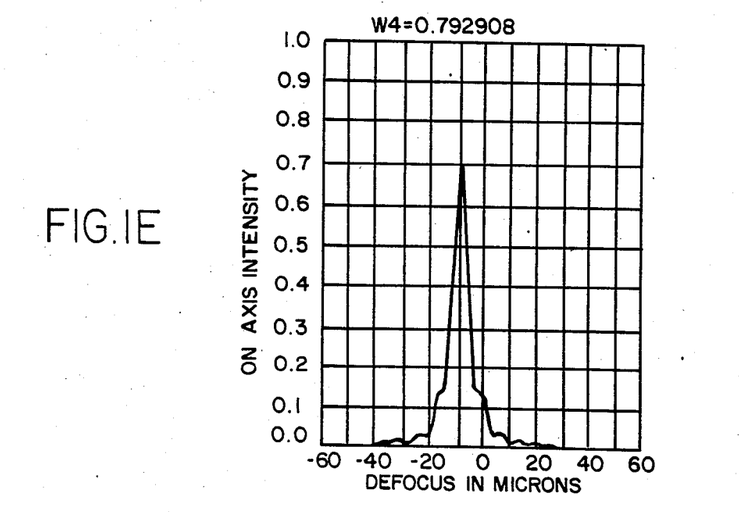
Figures 1F, 1G, 1H:
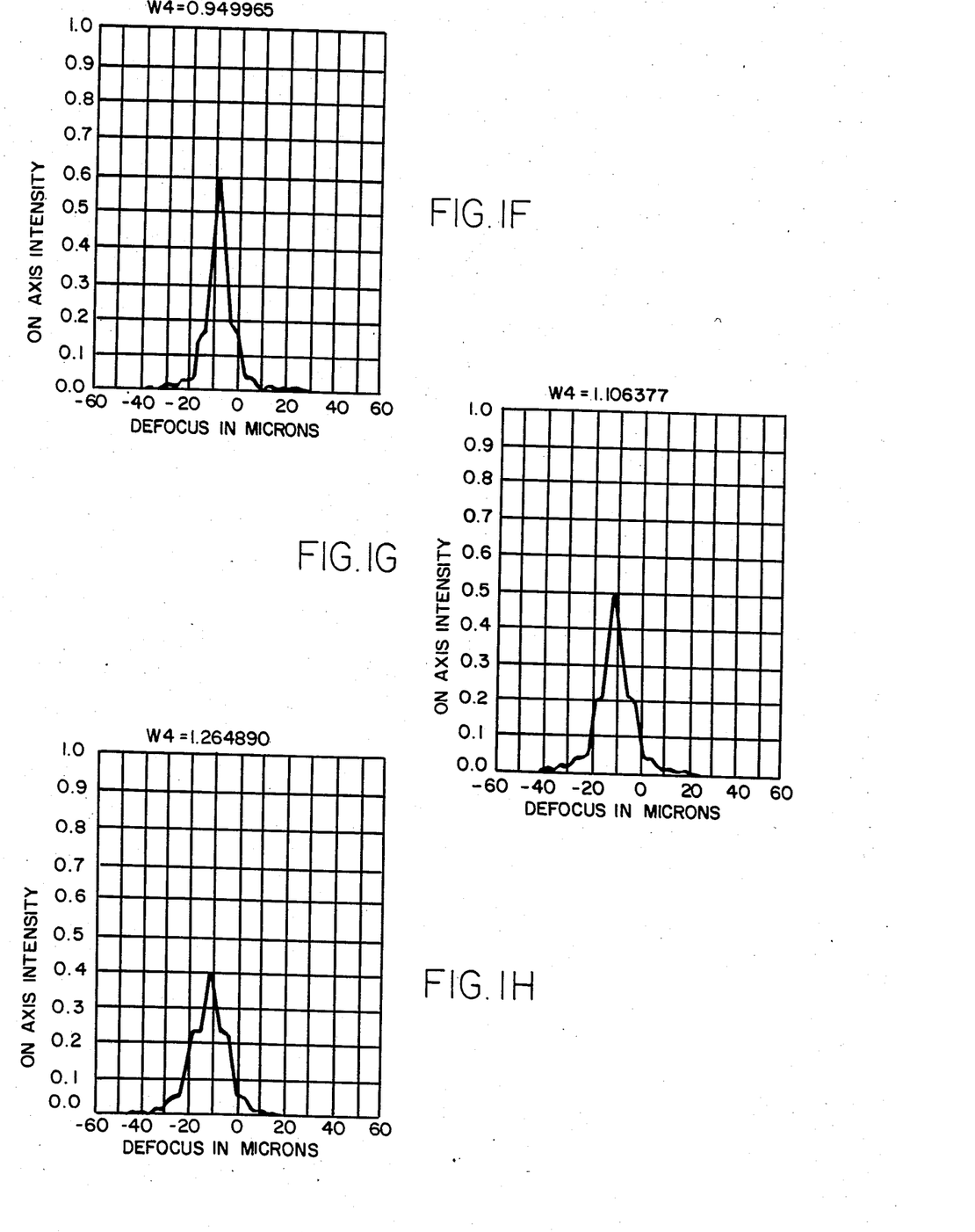
Figure 1I:
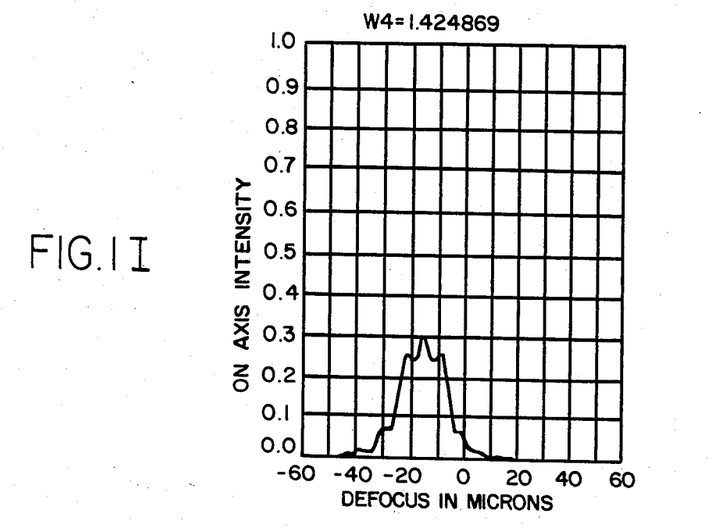
Figure 1J:
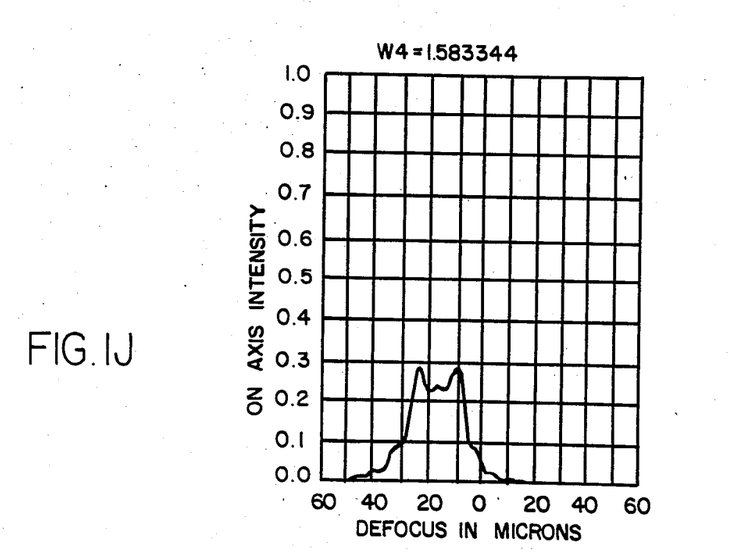
Figures 1K, 1L, 1M:
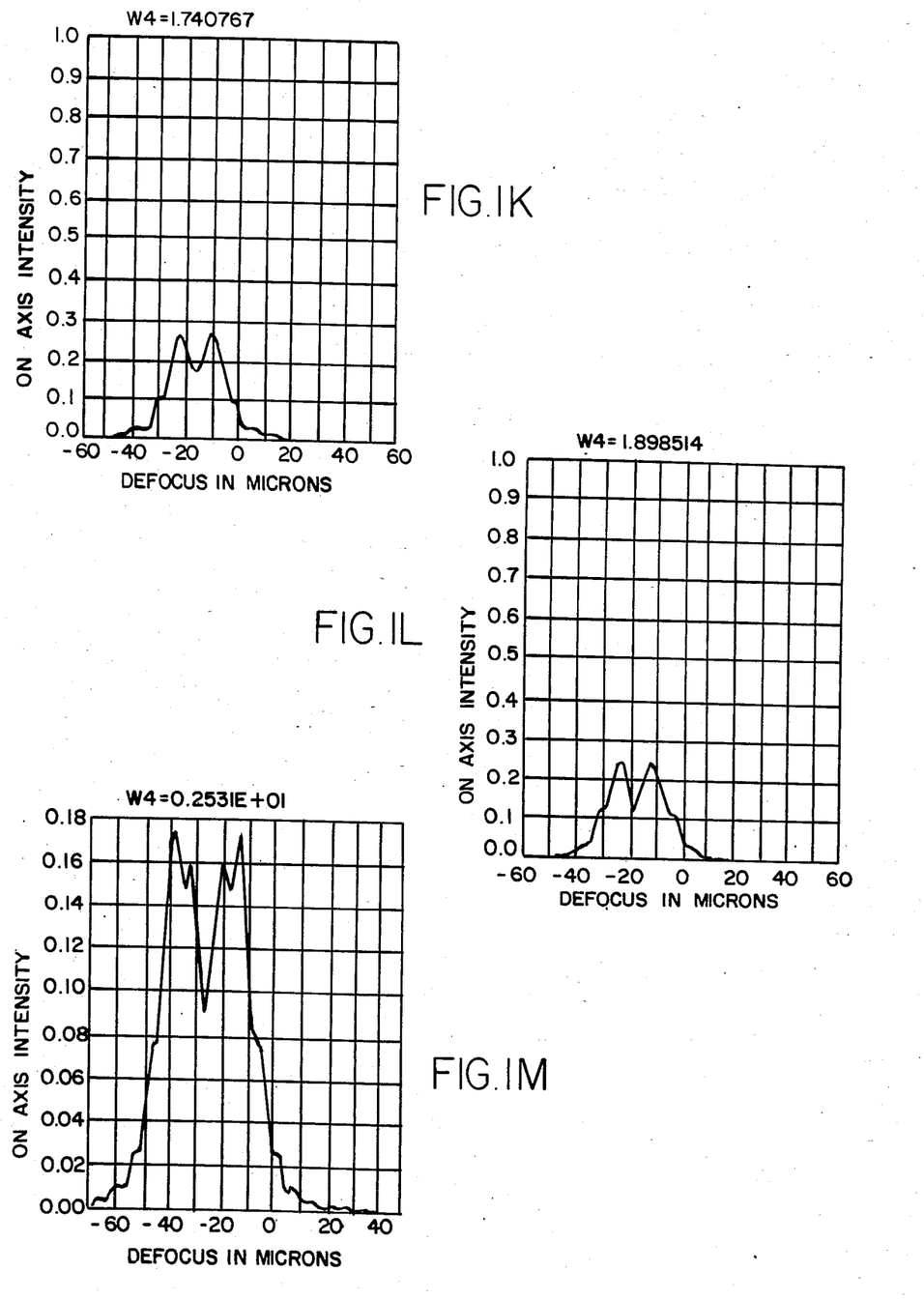
Figure 1N:
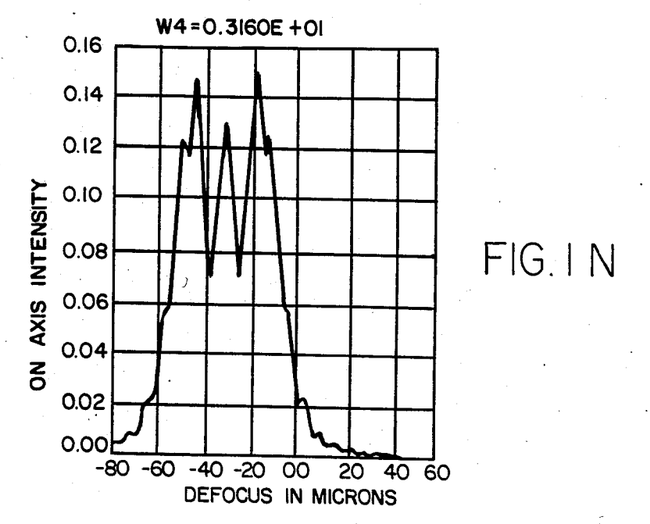

A brief description of the program can be found in Appendix 3. The results are shown in FIG. 1a-0. These are *axial* intensity plots. FIG. 1a-1 shows profiles from λ/4 to λ3 in λ/4 increments. FIGS. 1m, n, O are for $W_{040} = 4$, 5, and 10 λ respectively. (Note λ=0.6328 μm). The paraxial plane is located at $W_{020} = 0.0$ microns in allm plots. It is important to note that despite the bizarre appearance of some of these profiles, they are all *symmetric* about the point defined by Equation 2. This point need not be a peak as can be seen from FIGS. 1k, l, and m. In these simulations, the x-axis is plotted in terms of $W_{020}$, which is related to δ via Equation 7. (In a laboratory experiment, it is δ which would be measured.)

The intensities in the FIG. 1 plots are normalized to the diffraction limited axial intensity. However, pupil size does not affect the shape or relative position of the axial intensity plots for a given amount of spherical aberration. If we have a perfect lens of *fixed* diameter and introduced spherical aberration introduced via the input beam, the plots for different amounts of spherical aberration would be identical to those in FIG. 1.

Figure 2:
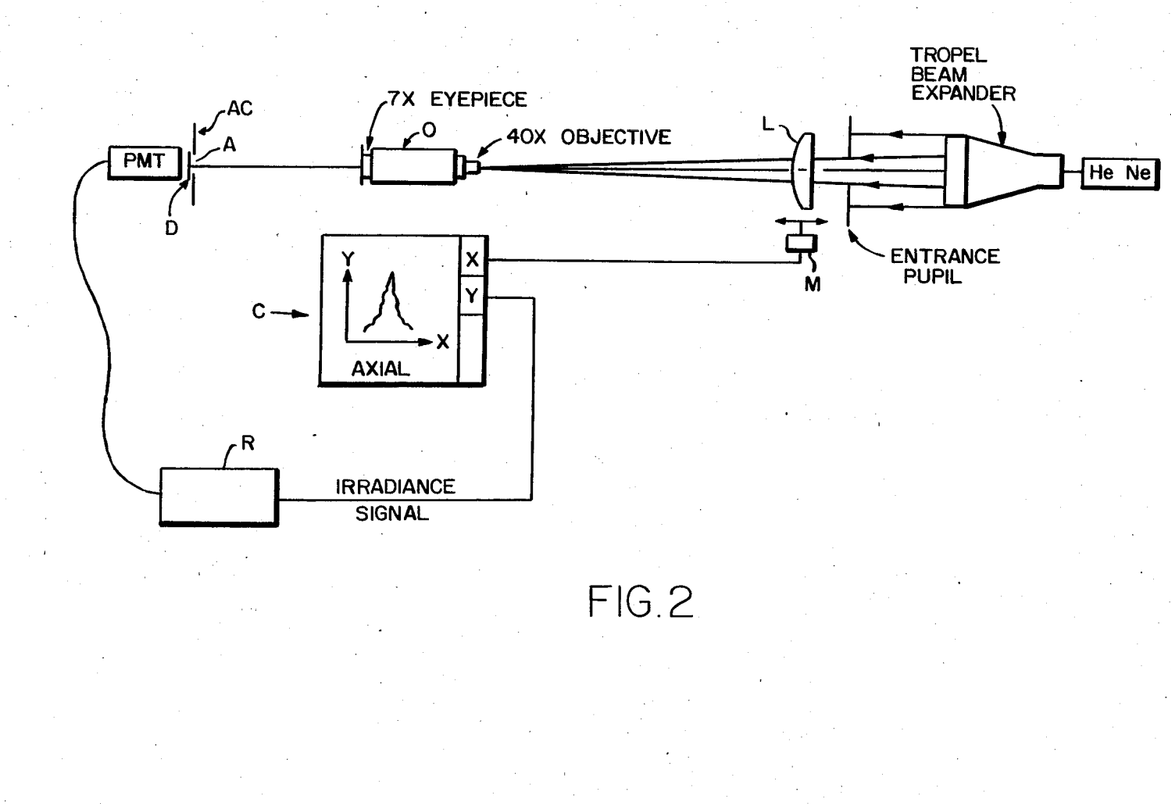
FIG. 2 is an experimental configuration for making axial intensity scans.
Figure 3A:
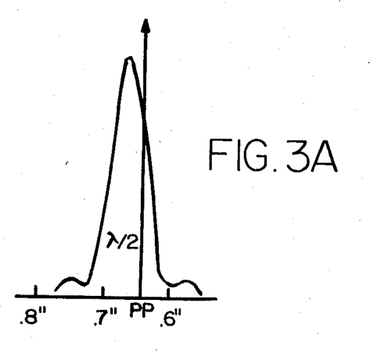
Figure 3B:
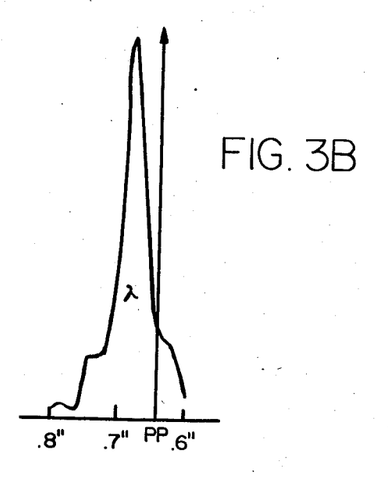
Figure 3C:
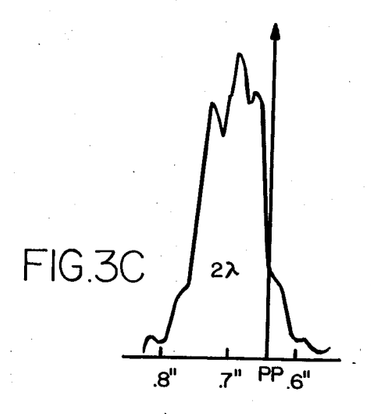
Figure 3D:
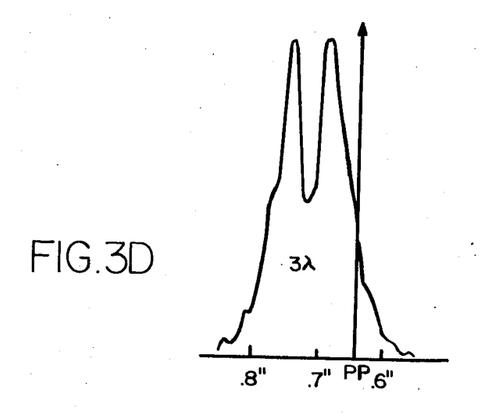
Figure 3E:
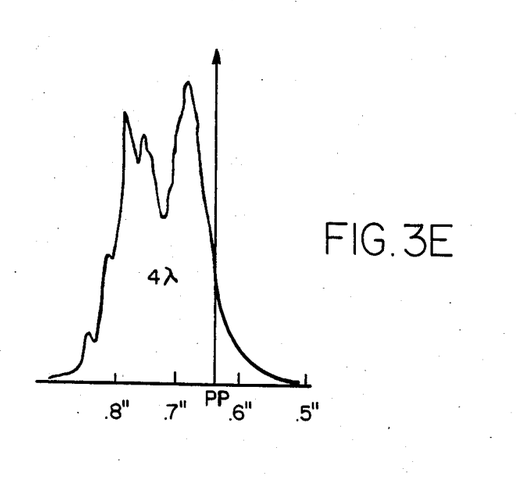
Figure 3F:
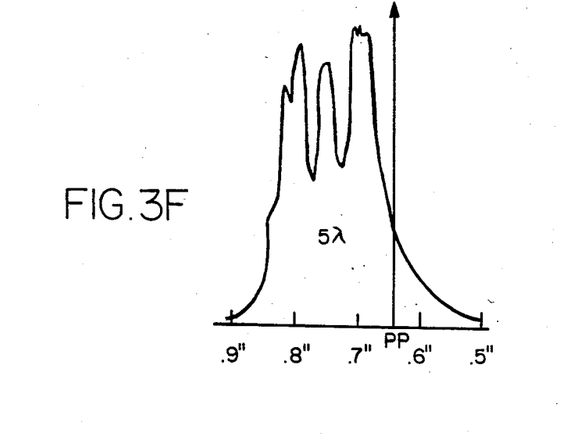
Figure 3G:
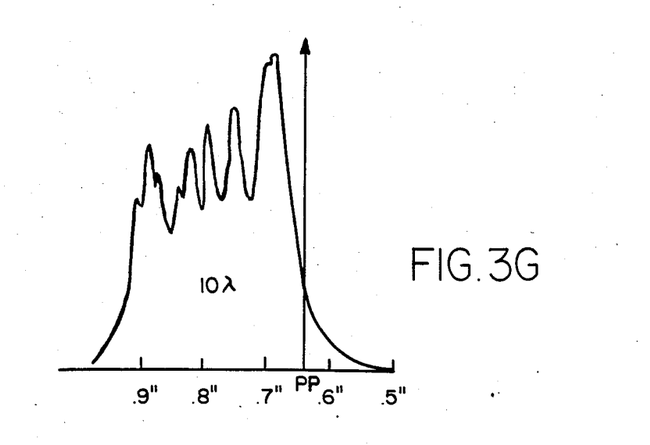

The analyses in the preceding sections indicate a novel means of determining spherical aberration in practice. An embodiment in practice of the invention for measuring axial intensity is illustrated in FIG. 2. In this arrangement, light rays from a source of collimated light are projected through a beam expander, such as a Tropel beam expander, through lens L (the lens under test), through a microscope having an objective O, such as a 40× objective, and an eyepiece, such as a 7× eyepiece, through an aperture card AC, and through aperture A defined in card AC via diffuser D, to photo-multiplier tube (PMT). Lens L is displaceable along the optical axis of the apparatus by means of a micrometer stage M. The output of the PMT is coupled to a radiometer and the detected irradiance signal therefrom is supplied to a chart recorder C, which also receives positional data from micrometer stage M, so as to render an x-y point plot of the tested lens L.

In operation, data is taken in discrete steps. First, the lens is shifted by adjustment of micrometer M longitudinally through some increment. Then the far field pattern as seen at the aperture card in front of the detector (photo-multiplier tube PMT) is adjusted laterally so that it is concentric with the sampling aperture. Finally, the intensity through the sampling aperture, via diffuser D and the PMT, is measured. This lens position-intensity information is recorded as a point on the chart recorder. The process is repeated until the entire axial intensity curve is point-plotted.

Figure 4:
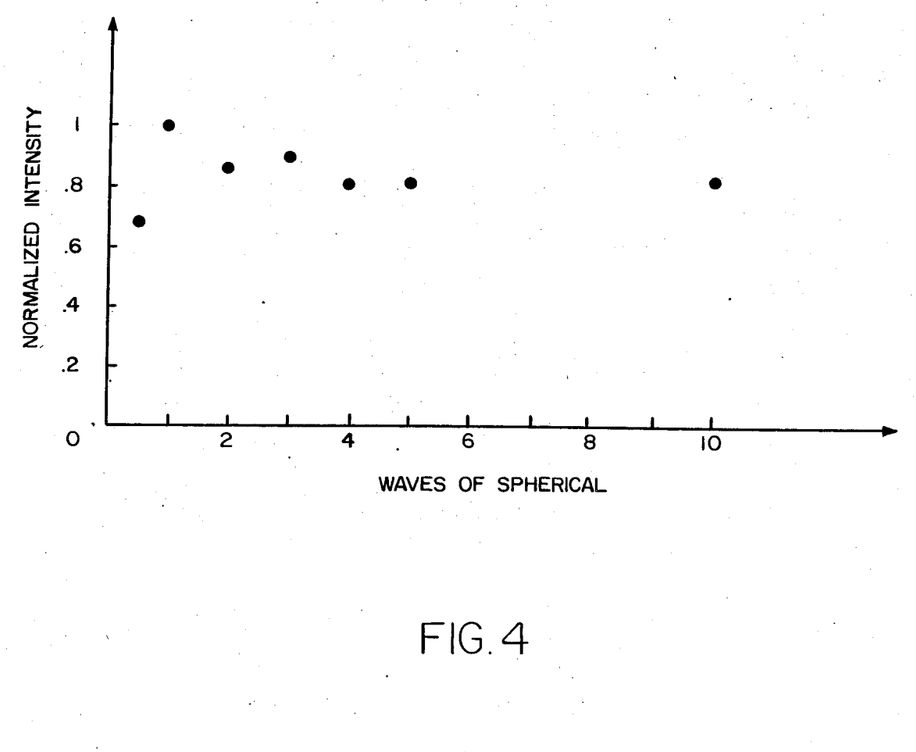
FIG. 4 is a graphical representation of fluctuation in the maximum intensity peak as a function of pupil size.

The amount of spherical aberration introduced in the tests can be determined by various sized circular apertures being placed in front of the lens. For example, sizes were determined from Equation 12 for $W_{040} = 0.5$, 1, 2, 3, 4, 5, and 10 waves respectively. FIG. 3a-g shows the results, where the numeric scale represents an arbitrary linear scale of the micrometer M. Differences between these plots vs the theoretical patterns of FIG. 1 are due to the effective finite sampling aperture size (~4 μm diameter) employed in the experiment. The axial scans in FIG. 1 are *point* intensity calculations. In addition, the data in FIG. 3 is not locally normalized. There is real oscillation in the maximum intensity peak as a function of pupil radius as shown in FIG. 4. Aside from these caveats, the plots in FIG. 1 are fairly well represented by the corresponding scans in FIG. 3. (Note that the latter are plotted against δ, not $W_{020}$.)

The important feature to recognize in each of the experimental scans is the point of "symmetry". This position is easily identified. By measuring the separation, $\delta_s$, between this point and the paraxial plane, we obtain a measure of the amount of spherical aberration present in the system. (Recall that $\delta_s$ is related to $W_{040}$ through Equation 7.)

Figure 5:
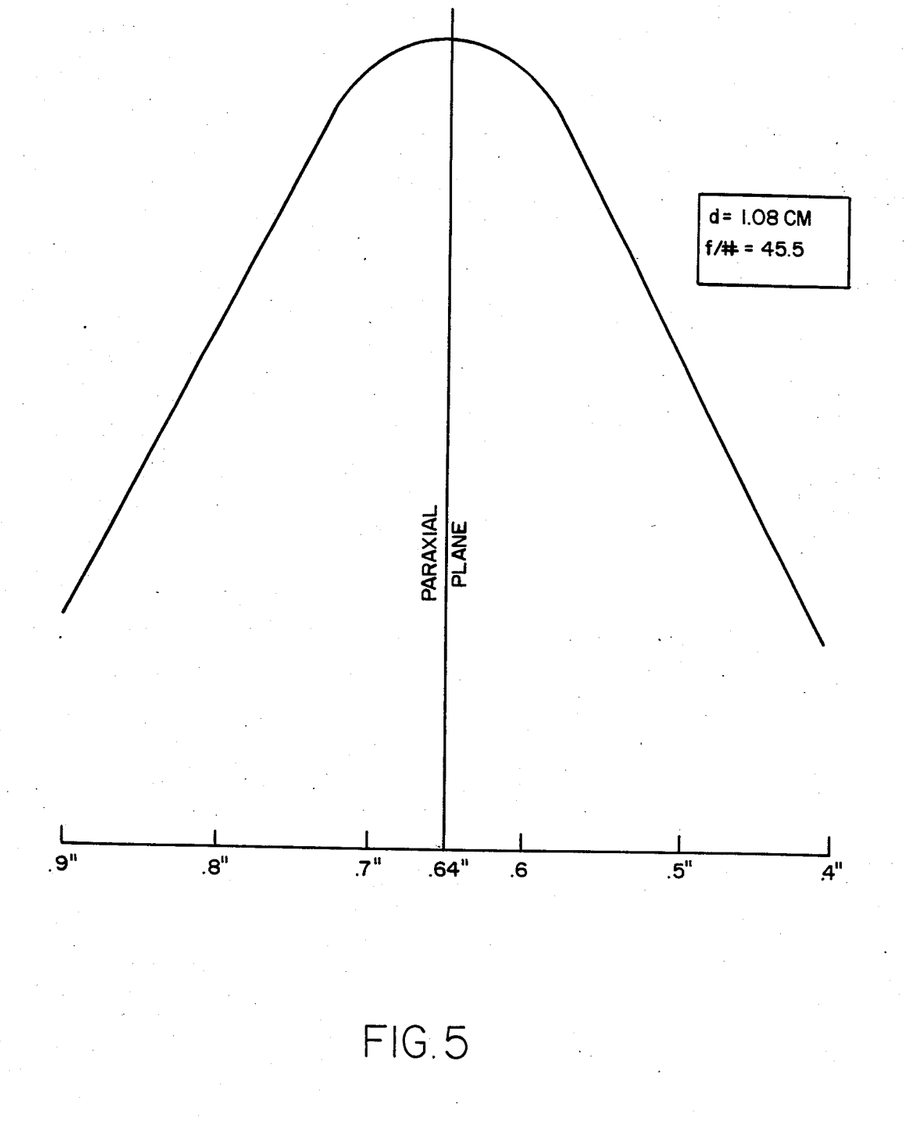
FIG. 5 is a graphical demonstration of determination of paraxial focus.

In FIG. 1, the paraxial plane is easily identified. It is found experimentally by doing an axial scan for the system stopped way down, i.e., small aperture. FIG. 5 shows the axial scan for the lens stopped down to f/45.5. Using Equation 12, the amount of spherical aberration is 0.014. This is very insignificant. The center of symmetry in FIG. 5 is easily identified, and marks the experimentally determined paraxial plane.

The f number (f/45.5) is the number obtained after mathematically dividing the focal length o the lens by the length of the lens aperture. The axial scan results yields the focal plane location along the optical axis as follows. The length from the the lens will have its highest intensity at its actual focus. The highest intensity of light observed along the optical axis occurs at the paraxial focus, the location of which is yielded by the axial scan.

As mentioned above, the actual focus of the lens is identical to the paraxial focus only where there exists no spherical aberration in the lens. Where slight spherical aberration exists, the actual focus of the lens is near the paraxial focus. Although a variety of techniques are used in the art to locate the actual focus of a lens, a particular technique is as follows. First, the paraxial focus is determined by performing an axial scan and observing the location where light has its highest intensity along the optical axis of the lens. Once the paraxial focus has been located, the actual focus is located empirically by taking scans in proximity to the paraxial focus and observing if there is a point where the light from the lens increases in intensity above that observed in the paraxial focus.

The circular apertures actually used did not quite have the calculated values. Table I lists their measured values along with revised F-numbers and recalculated $W_{040}$'s via Equation 12. Table I also includes measured $\delta_s$, and the determination of the amount of spherical from Equation 7. Note that the measured spherical is always less than the corresponding calculated value. The Tropel collimating lens of the 6" beam expander used in one embodiment was found to have $-0.3$ of spherical. However, even for the maximum aperture used in these tests, the Tropel would have contributed only $-0.005$ to out results . . . not a significant amount. Perhaps of greater import is the irradiance profile in the exit pupil. The beam exiting the Tropel has a truncated gaussian *intensity* rather than a flat or uniform profile. [Note the computer results were for the latter scenario.]

TABLE 1

Comparison of calculated vs measured spherical aberration

| r (cm) | f/# | $\delta_s$ (mm) | Calculated $W_{040}$ ($\lambda$) | Measured $W_{040}$ ($\lambda$) | $\Delta(W(\lambda))$ |
|---|---|---|---|---|---|
| 1.38 | 17.78 | 0.75 | 0.62 | 0.47 | .15 |
| 1.62 | 15.14 | 1.02 | 1.18 | 0.88 | .30 |
| 1.85 | 13.26 | 1.46 | 1.99 | 1.64 | .35 |
| 2.05 | 11.97 | 1.90 | 3.00 | 2.62 | .38 |
| 2.20 | 11.15 | 2.14 | 3.97 | 3.40 | .57 |
| 2.37 | 10.35 | 2.63 | 5.35 | 4.85 | .50 |
| 2.77 | 8.86 | 3.70 | 9.98 | 9.31 | .67 |

Figure 6:
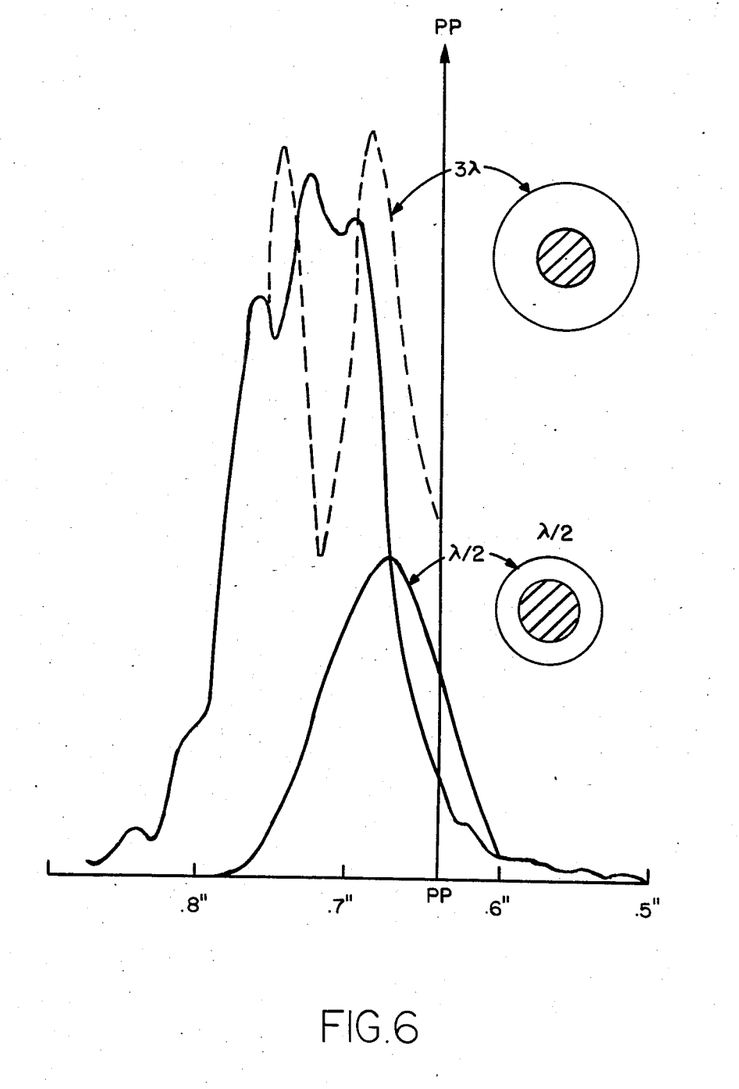
FIG. 6 is a graphical representation of the effect on axial scans of central obscurations.

In addition to the experimental scans presented in FIG. 3, a brief test was run for a circular aperture with a central obscuration. The data is presented in FIG. 6 for $W_{040}=\lambda/2$ respectively. (The dashed data represents the unobscured 3 $\lambda$ case.) The general shape of the curves is better matched at $\lambda/2$ than at $3\lambda$. Nevertheless, in both instances $\delta_s$ is larger for the obscured case.

Thus it is shown that axial intensity scans are symmetric about the point defined by $W_{020}=-W_{040}$ for unobscured circular pupils. This feature forms the basis of our new method of measuring spherical aberration. This technique provides a *direct* measurement of spherical aberration. Interferometric methods need considerably more labor to extract the quantity of interest, and often require the use of sophisticated fringe reduction techniques, and analysis codes. Thus, the axial scan method offers definite advantages in simplicity.

While the present invention has been described in connection with rather specific embodiments thereof, it will be understood that many modifications and variations will be readily apparent to those of ordinary skill in the art and that this application is intended to cover any adaptation or variation thereof. Therefore, it is manifestly intended that this invention be only limited by the claims and the equivalents thereof.

APPENDIX 1

The Bessel-Fourier transform is given by . . .

$$u(\rho) = 2\pi \int_0^\infty f(r) e^{i\frac{\pi}{\lambda z} r^2} J_\phi(2\pi\rho r) r \, dr \quad (A1.1)$$

where $$f(r) = CYL\left(\frac{r}{2a}\right) e^{-i\frac{\pi}{\lambda f} r^2} \quad (A1.2)$$

and $$CYL\left(\frac{r}{2a}\right) = \begin{cases} 1, 0 \leq r < a \\ 5, r = a \\ 0, r > a \end{cases}$$

If we let $\delta = f - z$, assume that $\delta/f \ll 1$, and express things in normalize pupil coordinates, when Equation A1.1 can be rewritten as . . .

$$u(\rho) = 2\pi a^2 \int_0^1 e^{i\frac{\pi}{\lambda}(\frac{\delta}{f^2})a^2 R^2} J_\phi(2\pi\rho a R) R \, dR \quad (A1.3)$$

The axial amplitude can be found from . . .

$$u(0) = 2\pi a^2 \int_0^1 e^{ikWR^2} R \, dR \quad (A1.4)$$

where $$J_\theta(0) = 1$$

and $$kW = \frac{\pi}{\lambda}\left(\frac{a}{f}\right)^2 \delta$$

By letting $X = R^2$, Equation A1.4 becomes . . .

$$u(0) = \pi a^2 \int_0^1 e^{ikWX} dx \quad (A1.5)$$

Integration yields . . .

$$u(0) = \pi a^2 \left[\frac{e^{ikW} - 1}{ikW}\right] \quad (A1.6)$$

which can be rewritten . . .

$$u(0) = \frac{1}{2} \pi a^2 \left[ \frac{e^{ik(\frac{w}{2})} - e^{-ik(\frac{w}{2})}}{ik\left(\frac{w}{2}\right)} \right] e^{ik(\frac{w}{2})} \quad (A1.7)$$

or $$u(0) = \pi a^2 \left[ \frac{\sin \frac{1}{2}kw}{\frac{1}{2}kw} \right] e^{i\frac{1}{2}kw}$$

therefore $$u(0) = \pi a^2 \operatorname{sinc}\left(\frac{1}{2}kw\right) e^{i\frac{1}{2}kw} \quad (A1.8)$$

The axial Fraunhoffer amplitude is given by . . .

$$u_F(0) = \frac{B}{\lambda f} u(0)$$

where B is complex. The axial intensity is found from .

$$I(0) = u_F(0) u_F^*(0) \quad (A1.9)$$

Consequently . . .

$$I(0) = \left(\frac{\pi a^2}{2\lambda f}\right)^2 \operatorname{sinc}^2\left(\frac{1}{2}kW\right) \quad (A1.10)$$

The axial intensity is therefore symmetric for the conditions described However, if the assumption $\delta/f<<1$ cannot be made, as in the case of very large F-numbers,[1] then I(0) is no longer symmetric.

APPENDIX 2

The symmetry in the axial intensity about $W_2 = -W_4$ is easily obtained by working in Fourier space. The axial field is $$u(W_2) = \frac{\text{Const}}{z} \int_0^1 e^{ikW_4 r^4} e^{ikW_2 r^2} r dr, \quad (A2.1)$$

where z is the distance from the lens to the image plane and is related to the paraxial focal distance by $f = z + \delta$ where $\delta = -z(f/a)^2 W_2$. For our work we assume that $\delta<<f$ so that $z \sim f$ and the coefficient in front of the integral is independent of $W_2$.

Eq. (A2.1) can be cast into the form of a Fourier transform by letting $r^2 = x$. Thus, $$u(W_2) = \text{Const} \int_{-\infty}^{\infty} e^{i2\pi \omega x} \operatorname{rect}(x - 1/2) e^{i\pi x^2/c} dx. \quad (A2.2)$$

where $\omega = W_2/\lambda$, $-\infty \leq \omega \leq +\infty$, $c = \lambda/2W_4$, and the finite limits have been incorporated into the rect function. This equation is equivalent to the convolution $$u(W_2) = \quad (A2.3)$$

$$\frac{\text{const}}{2W_4} \int_{-\infty}^{\infty} e^{i\pi \xi} \operatorname{sinc}(\xi) \exp\left[-\frac{i\pi \Delta}{2W_4}\left(\frac{W_2}{\lambda} - \xi\right)^2\right] d\xi.$$

The next step consists of manipulating the argument of the exponential. With a little work, Eq. (A2.3) takes the form $$u(W_2) = \quad (A2.4)$$

$$\text{Const} \exp\left[-\frac{i\pi W_2^2}{2W_4}\right] \exp\left[\frac{i\pi}{2W_4}(W_2 + W_4)^2\right] \text{ (times)}$$

$$\int_{-\infty}^{\infty} \operatorname{sinc}(\xi) \frac{1}{2W_4} \exp\left[\frac{-i\pi}{2W_4}[\xi - (W_2 + W_4)]^2\right] d\xi.$$

Lastly, we transform to the Strehl plane, through $W_2 = -W_4 + \epsilon$, and form the intensity, $$I(\epsilon) = \text{Const} \left[ \int_{-\infty}^{\infty} \operatorname{sinc}(\xi) \frac{1}{2W_4} \exp\left[\frac{i\pi}{2W_4}(\xi - \epsilon)^2\right] d\xi \right] \text{ (times) } C.C. \quad (A2.5)$$

Eq. (A2.5) shows that the axial intensity is symmetric about the Strehl plane $\epsilon = 0$ or $W_2 = -W_4$. In passing we note that as $W_4 \to 0$ the exponential approaches $\delta(W_2)$, and consequently, $I(W_2) \to [\sin(\pi W_2/\lambda)/(\pi W_2/\lambda)]^2$, as it should. Also, for small $W_4$ the exponential is approximately $\delta(\xi - (W_2 + W_4))$ and the intensity approaches $[\sin c (W_2 + W_4)]^2$. This behavior is shown in the figures for $W_4 \geq 0.1\lambda$.

APPENDIX 3

For circularly symmetric aberrations the lens induced propageted field is $$u(\rho) = K \int_0^\infty CYL\left(\frac{r}{2a}\right) e^{\frac{i\pi r^2}{\lambda z}} e^{\frac{-ikr^2}{2f}} e^{iW_4 r^4} r dr \quad (A3.1)$$

where the second and third exponentials express the phase induced by the lens. By making the approximation $(1/z - 1/f) = \lambda/f^2$ for $z<<f$ and employing the defocus shift equation $\delta = 2(f/a)^2 W_2$, Eq. (A3.1) becomes $$u(\rho) = K \int_0^1 e^{iK(W_2 r^2 + W_4 r^4)} J_0(2\pi a r \rho) r dr \quad (A3.2)$$

where a is the aperture radius and the intensity is u u. Equation A3.2 is used for determining the axial intensity by setting $\rho = 0$. In order to solve Eq. A3.2, it is written in its differential form and a variable order Adams predictor-corrector method is applied using the Gear package. The intensity is normalized to the axial focal plane intensity $I_0$, for $=W_4=0$, which is related to the aperture intensity $I_a$ by $I_\phi = (\pi a^2/\lambda f)^2 I_a$. While this the preferred mode of solving Eq. A3.2, other means known to those skilled in the art are equally within the scope of the present invention.

What is claimed is:

1. An apparatus for measurement of spherical aberration of a test lens, comprising:
   a beam expander,
   a micrometer-mount for said test lens,
   a means for moving said test lens longitudinally along its optical axis,
   a microscope,
   a diffuser,
   an aperture card defining an aperture therein,
   a photo-amplifying means, and
   a means for measuring irradiance,
   said beam expander, micrometer mount, microscope, diffuser, aperture card, and amplifying means being aligned along a common axis, said test lens placeable in said axis by means of said micrometer-mount, and said test lens being moved along its optical axis by said moving means to provide proper axial intensities from said test lens, collimated light being projectable through said beam expander and along said axis and through said aperture to impinge upon said amplifying means, said measuring means receiving and measuring said collimated light from said photo-amplifying means and determining a location of a paraxial focus by measuring light along an optical axis of said test lens, said measuring means determining a location of an actual focus of said test lens by measuring said collimated light in proximity to said paraxial focus, said actual focus and said paraxial focus yielding therefrom the spherical aberration of the test lens.

2. The apparatus of claim 1, wherein said microscope comprises a 40× objective and a 7× eyepiece.

3. The apparatus of claim 1, wherein said amplifying means comprises a photo-multiplier tube and a radiometer.

4. The apparatus of claim 3, wherein said measuring means comprises chart recorder, the output from said radiometer and positional data from said micrometer being applied thereto.

* * * * *